United States Patent
Hatala

(10) Patent No.: US 6,516,490 B1
(45) Date of Patent: Feb. 11, 2003

(54) ICE SCRAPER CONSTRUCTION

(76) Inventor: Thomas Hatala, 40 N. Mill Rd., Cranbury, NJ (US) 08512

( * ) Notice: Subject to any disclaimer, the term of this patent is extended or adjusted under 35 U.S.C. 154(b) by 26 days.

(21) Appl. No.: 09/711,474

(22) Filed: Nov. 13, 2000

Related U.S. Application Data

(63) Continuation-in-part of application No. 09/271,353, filed on Mar. 17, 1999, now abandoned.

(51) Int. Cl.$^7$ ............................................... A47L 13/08
(52) U.S. Cl. ................. 15/236.02; 15/236.01; 30/169; 30/295
(58) Field of Search ............... 15/236.01, 236.02, 15/236.05, 245.1, 235.4, 246; 30/169, 172, 164.7, 286, 295; D32/46, 48

(56) References Cited

U.S. PATENT DOCUMENTS

| | | | |
|---|---|---|---|
| 926,567 A | * 6/1909 | Hozior | 15/246 |
| 1,412,728 A | 4/1922 | Werner | 30/169 |
| 1,444,659 A | * 2/1923 | Carlson | 30/295 |
| 2,115,686 A | * 4/1938 | Zimmer | 30/295 |
| 2,153,759 A | * 4/1939 | Katzinger | 30/295 |
| 2,276,231 A | 6/1942 | Cathcard et al. | 15/245.1 |
| 2,563,940 A | 8/1951 | Krasberg | 15/236.01 |
| 3,130,436 A | 4/1964 | Krause et al. | 15/236.02 |
| 3,274,684 A | 9/1966 | Marks | 30/171 |
| 3,670,414 A | 6/1972 | Stecker | 15/236.01 |
| 4,124,915 A | * 11/1978 | Schlicher | 15/105 |
| 4,468,831 A | 9/1984 | Schneider | 15/236.02 |
| 4,495,670 A | * 1/1985 | Baker | 15/145 |
| 4,542,554 A | 9/1985 | Wallerstein | 15/236.02 |
| 4,612,707 A | 9/1986 | Shea | 30/169 |
| 5,099,540 A | 3/1992 | Paschetto | 15/236.02 |
| 5,101,530 A | * 4/1992 | Hansen et al. | 15/245 |
| 5,261,144 A | 11/1993 | Mitchell et al. | 15/236.01 |
| 5,263,222 A | 11/1993 | Johnstone, II | 15/236.02 |
| 5,418,998 A | 5/1995 | Smarra | 15/105 |
| 5,580,608 A | 12/1996 | Capoccia | 15/245.1 |
| 5,615,445 A | 4/1997 | Kelsay et al. | 15/245.1 |
| 5,666,732 A | 9/1997 | Shea | 30/169 |
| 5,857,237 A | 1/1999 | Dranginis | 15/236.02 |
| 5,887,312 A | 3/1999 | Curtin | 15/236.01 |
| 6,092,255 A | * 7/2000 | Kim | 15/121 |

* cited by examiner

*Primary Examiner*—Theresa T. Snider
(74) *Attorney, Agent, or Firm*—Henderson & Sturm LLP

(57) ABSTRACT

An ice scraper construction (10) for cleaning ice and/or snow from vehicle windows wherein the construction (10) includes a handle member (20) having a pair of slots, (25), (28) whose upper ends are provided with an elongated cylindrical recess (29), a generally straight blade member (30), and a contoured deflector member (50). Both the blade member (30) and the deflector member (50) have elongated cylindrical beads (34) and (54), respectively, that are dimensioned to be laterally received within the cylindrical recesses (29) in the handle member (20).

5 Claims, 2 Drawing Sheets

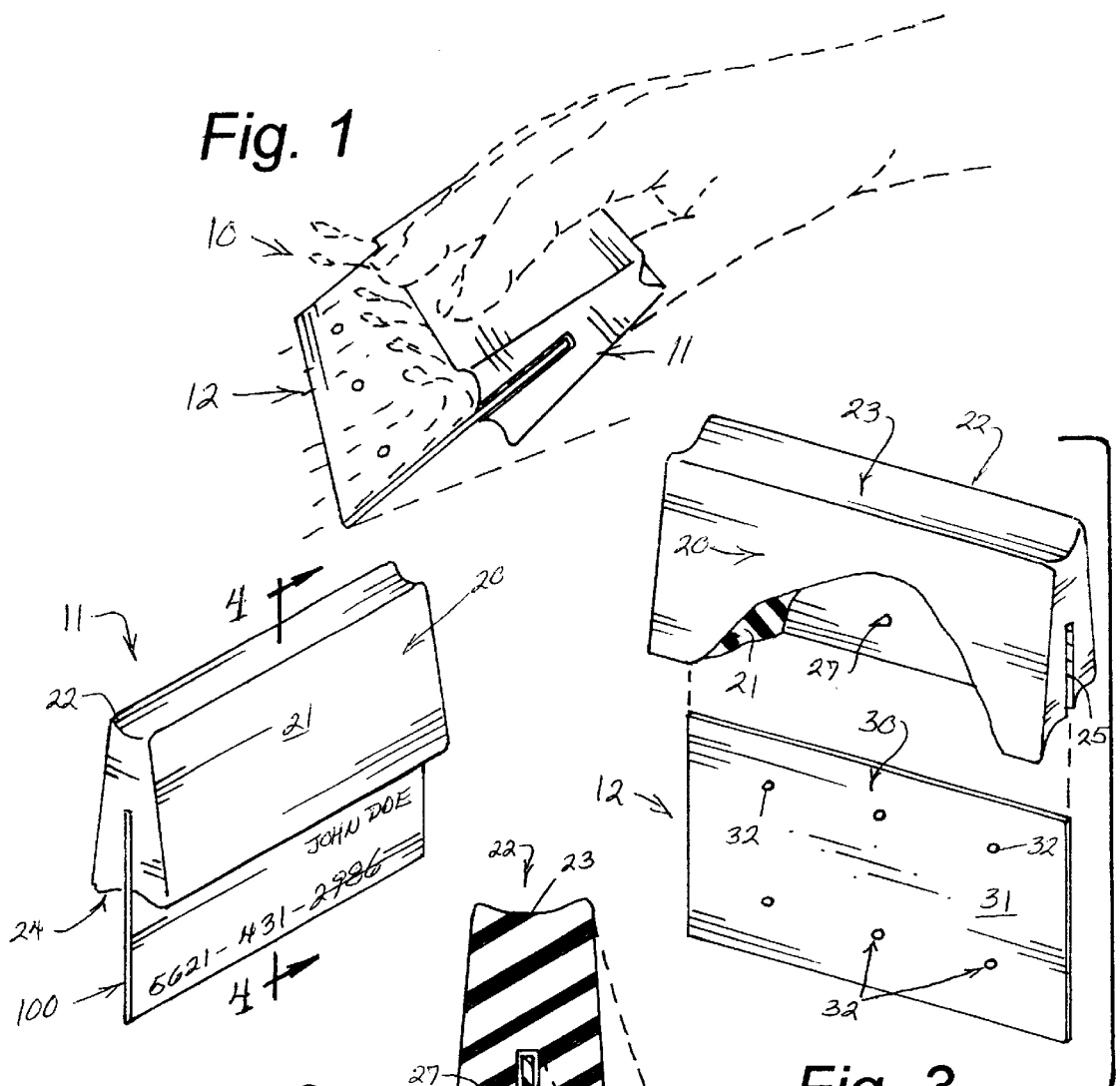

ICE SCRAPER CONSTRUCTION

This application is a continuation-in-part of U.S. Pat. application Ser. No. 09/271,353 filed Mar. 17, 1999 entitled "Ice Scraper Construction,", now abandoned.

BACKGROUND OF THE INVENTION

1. Field of the Invention

The present invention relates to the field of ice scrapers in general, and in particular to an ice scraper handle designed to accommodate a plurality of elements, including a credit card or similar item as a reversible blade element.

2. Description of Related Art

As can be seen by reference to the following U.S. Pat. Nos. 3,274,684; 4,542,554; 5,263,222; and 5,418,998, the prior art is replete with myriad and diverse fixed and replaceable blade ice scraping devices.

While all of the aforementioned prior art constructions are more than adequate for the basic purpose and function for which they have been specifically designed, they are uniformly deficient with respect to their failure to provide a simple, efficient, and practical ice scraper construction designed to accommodate either a standard equipment reversible scraper blade and a deflector element or in an emergency, a conventional credit card.

As most people in colder climates are all too well aware, the primary problem with fixed blade ice scrapers is that once the scraper blade is broken, the device is virtually useless. Furthermore, the problem with replaceable blade ice scrapers is the fact that they will only accept a replacement blade that is specifically designed for that particular ice scraper. In addition, most ice scrapers do not make any provision to deflect ice and snow away from a user's hand during the scraping process.

As a consequence of the foregoing situation, there has existed a longstanding need for a new and improved type of ice scraper construction that not only is provided with a replacement blade and ice deflector, but which also is designed to accept a conventional credit card as a scraper blade substitute, and the provision of such a construction is a stated objective of the present invention.

BRIEF SUMMARY OF THE INVENTION

Briefly stated, the preferred embodiment of the ice scraper construction that forms the basis of the present invention comprises in general, a handle unit, a deflector unit, and a blade unit. The handle unit includes a contoured handle member fabricated from a generally flexible material and provided with a plurality of elongated slots provided with gripping means for releasably engaging the blade unit and the deflector unit.

As will be explained in greater detail further on in the specification, while the blade unit of the preferred embodiment comprises a generally rigid reversible blade member dimensioned to be received in the handle slot and provided with discrete apertures that cooperate with the blade gripping means in the handle member, the handle member of the alternate version of the preferred embodiment is also designed to releasably receive a conventional plastic credit card should the reversible blade member become lost, or otherwise rendered unusable.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the alternate version of the ice scraper construction of this invention in use;

FIG. 2 is a perspective view of the handle unit being equipped with a conventional plastic credit card;

FIG. 3 is an exploded perspective view of the handle unit and the blade unit;

FIG. 4 is a cross sectional view taken through line 4—4 of FIG. 2;

DETAILED DESCRIPTION OF THE INVENTION

Figures 5, 6:
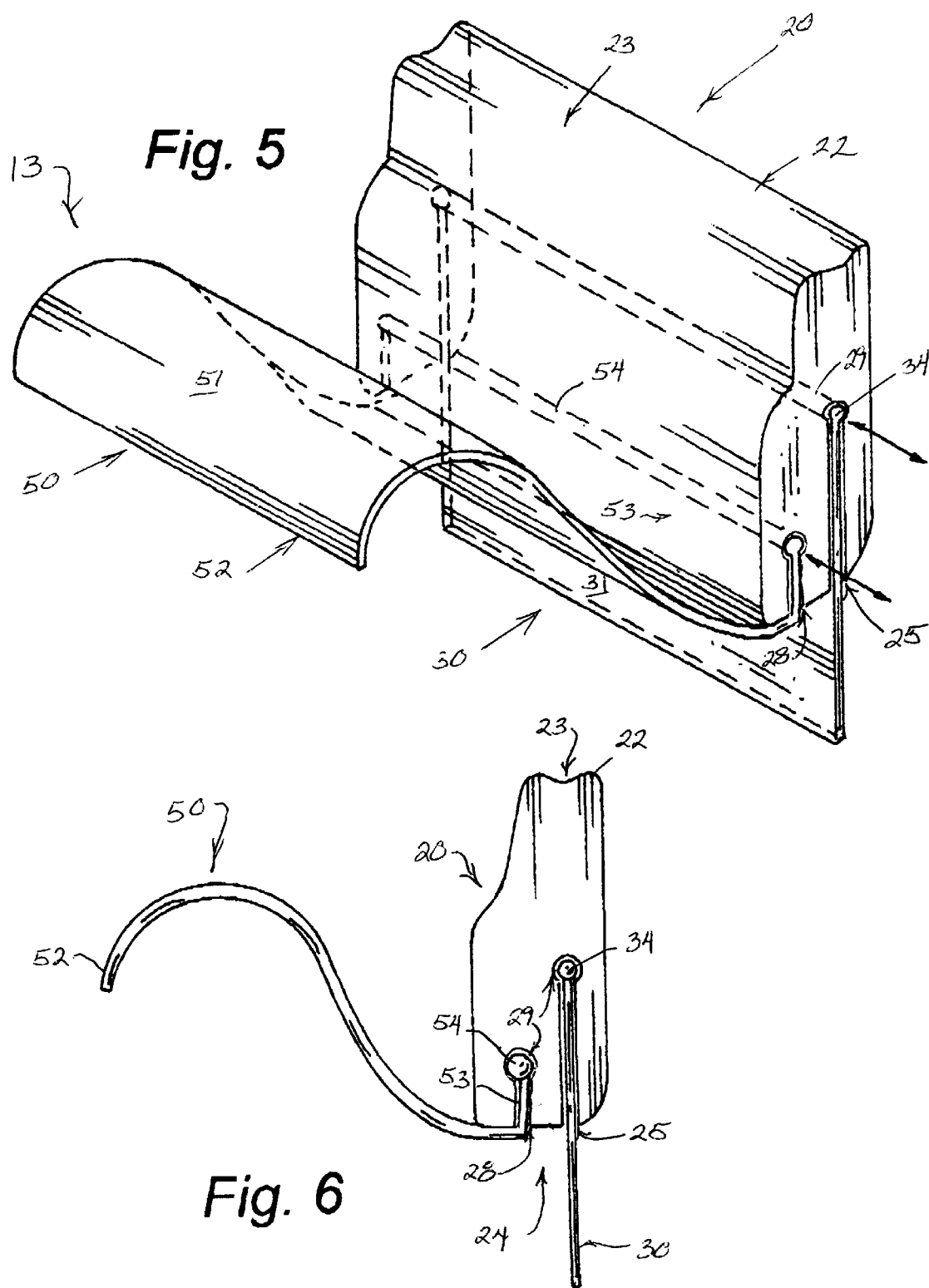
FIG. 5 is a perspective view of the preferred embodiment of this invention.
FIG. 6 is a side elevation view of the preferred embodiment.

As can be seen by reference to the drawings, and in particularly to FIG. 1, the alternate version of the ice scraper construction that forms the basis of the present invention is designated generally by the reference number 10. The construction 10 comprises in general, a handle unit 11, and a blade unit 12. These units will now be described in seriatim fashion.

As shown in FIGS. 2 through 4, the handle unit 11 comprises a contoured handle member 20 fabricated from a semi-rigid, yet flexible material 21 such as hard rubber or soft plastic. The proximal end 22 of the handle member 20 is relatively narrow and provided with an elongated curved recess 23. The distal end 24 of the handle member 20 is relatively wide and provided with an elongated central slot 25 which is flanked by a pair of curved flanges 26 whose purpose and function will be described presently.

In addition, the interior of the central slot 25 is provided with a plurality of generally rigid prongs 27 which are adapted to engage either the blade unit 12 or a conventional credit card 100, as will be likewise explained presently.

As can best be appreciated by reference to FIG. 1, the curved flanges 26 are designed and dimensioned to serve as snow and ice deflectors that will prevent the scraped ice and/or snow particles from being deposited on the user's hands.

Furthermore, as shown in FIG. 4, the curved recess 23 in the proximal end 22 of the handle member 20 is provided to facilitate the separation of the bifurcated portions of the handle member 20 on opposite sides of the central slot.

Turning now to FIG. 3, it can be seen that in the alternate version of the preferred embodiment of the invention, the blade unit 12 comprises a generally rectangular thin flat blade member 30 fabricated from a generally rigid yet flexible material 31 such as plastic which will not scratch the windshield surface.

In addition, both the upper and lower portions of the blade member 30 are provided with rows of apertures 32. Each row of apertures 32 are dimensioned to receive the plurality of prongs 27 on the interior of the central slot 25 of the handle member 20 when the adjacent end of the blade member 30 is inserted into the central slot 25.

In this manner, if one edge of the blade member 30 becomes chipped or cracked, the blade member 30 can be reversed within the slot 25 to bring a fresh edge to bear on the windshield surface.

Turning now to FIGS. 2 and 4, it can be seen that in the event that the blade member 30 becomes lost, misplaced, or broken, the user may simply substitute a conventional plastic credit card 100. The pointed prongs 27 in the slot 25 will frictionally grip one side of the credit card 100 in a well recognized manner.

In the preferred embodiment of the invention illustrated in FIGS. 5 and 6, it can be seen that the enlarged distal end 24 of the handle member is provided with an elongated slot 25 and a relatively short slot 28. The upper ends of both of the slots 25 and 28 have an enlarged generally cylindrical recess 29 whose purpose and function will be described presently.

As mentioned previously, the preferred embodiment of the ice scraper construction 10 includes a deflector unit 13 which comprises a deflector member 50 fabricated from a contoured sheet of generally rigid material 51 such as sheet metal or the like having a curved distal end 52 and a straight proximal end 53 provided with a cylindrical bead 54. The proximal end 53 of the associated bead 54 are dimensioned to be laterally received within the relatively short slot 28 and associated recess 29 in the handle member 20.

Furthermore, as shown in FIG. 6, the contour of the deflector member 50 resembles the numeral 2 when viewed from the side. The curved upper end 52 will collect and redirect loosened ice and snow away from the user's hand so that the ice scraper construction can be employed even when the user is not wearing gloves due to the fact that no loosened ice or snow will be deposited on the user's hand.

Still referring to FIGS. 5 and 6, it can be seen that in the preferred embodiment of the invention, the blade unit 12 comprises an elongated, generally thin and flat blade member 30 fabricated from a generally rigid, yet flexible material 31. The upper end of the blade member 30 is provided with an elongated cylindrical bead 34 such that the blade member 30 may be laterally received in the elongated slot 25 and the enlarged cylindrical recess 29 in the handle member 20.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. An ice scraper construction comprising:

a handle unit including a handle member having a relatively narrow proximal end and a relatively wide distal end provided with a pair of generally parallel slots; wherein, both of said pair of slots have an upper end provided with an elongated cylindrical recess;

a blade unit including a flat generally rectangular blade member having an upper end dimensioned to be received in one of said pair of slots; and a deflector unit including a deflector member fabricated from a contoured sheet of generally rigid material wherein the deflector member has a distal end that is curved and a proximal end that is generally flat and dimensioned to be received in the other of said pair of slots.

2. The construction in claim 1 wherein both the upper end of the blade member and the proximal end of the deflector member are provided with elongated cylindrical beads that are dimensioned to be laterally received within the elongated cylindrical recesses in the handle member.

3. The construction as in claim 2 wherein the contour of the deflector member resembles the number 2 when viewed from the side.

4. The construction as in claim 1 wherein the proximal end of said handle member is provided with an elongated curved recess.

5. The construction as in claim 4 wherein the handle member is fabricated from a generally rigid yet flexible material.

* * * * *